United States Patent
Perell et al.

(10) Patent No.: US 10,836,518 B2
(45) Date of Patent: Nov. 17, 2020

(54) RIGID HOLDING CONTAINER WITH BREACHABLE PERIMETER BUBBLE

(71) Applicant: PopPack LLC, San Francisco, CA (US)

(72) Inventors: William S. Perell, San Francisco, CA (US); Leif B. Sorensen, Cape Canaveral, FL (US)

(73) Assignee: PopPack, LLC, San Francisco, CA (US)

(*) Notice: Subject to any disclaimer, the term of this patent is extended or adjusted under 35 U.S.C. 154(b) by 104 days.

(21) Appl. No.: 16/264,141

(22) Filed: Jan. 31, 2019

(65) Prior Publication Data

US 2019/0161217 A1  May 30, 2019

Related U.S. Application Data

(60) Continuation of application No. 13/966,465, filed on Aug. 14, 2013, now Pat. No. 10,239,643, which is a
(Continued)

(51) Int. Cl.
*B65B 65/02* (2006.01)
*B65D 77/38* (2006.01)
(Continued)

(52) U.S. Cl.
CPC ............ *B65B 5/026* (2013.01); *B29D 22/003* (2013.01); *B65B 31/04* (2013.01); *B65D 75/326* (2013.01);
(Continued)

(58) Field of Classification Search
CPC .......... B65B 7/164; B65B 7/28; B65B 7/2878
(Continued)

(56) References Cited

U.S. PATENT DOCUMENTS 2,916,886 A  12/1959  Robbins
D190,685 S   6/1961  Roskam
(Continued)

FOREIGN PATENT DOCUMENTS

DE  20314741      1/2004
EP  0306207 A1   3/1989
(Continued)

OTHER PUBLICATIONS

Extended European Search Report dated Apr. 2, 2012.

*Primary Examiner* — Nathaniel C Chukwurah
*Assistant Examiner* — Mobeen Ahmed
(74) *Attorney, Agent, or Firm* — Dority & Manning, P.A.

(57) ABSTRACT

A rigid holding container has a flexible cover sheet extending over the holding area for sealing the contents. The container has a wide, flat perimeter lip which provides a firm base for the seal between the cover sheet and the container. A breaching bubble is formed in the seal, under the cover and over the perimeter lip. The consumer breaches the bubble by pressing the bubble against the lip between the thumb and forefinger. The pressure compresses the air in the bubble causing the bubble to expand laterally. The expanding bubble breaches along the perimeter of the lip, producing a peel flap of flexible cover material. The consumer pulls the peel flap while holding the rigid container down, to remove the cover sheet.

20 Claims, 4 Drawing Sheets

Related U.S. Application Data division of application No. 12/810,316, filed as application No. PCT/US2008/088100 on Dec. 23, 2008, now abandoned.

(60) Provisional application No. 61/009,491, filed on Dec. 31, 2007, provisional application No. 61/046,655, filed on Apr. 21, 2008.

(51) Int. Cl.
    *B65D 75/32* (2006.01)
    *B65D 77/30* (2006.01)
    *B65B 31/04* (2006.01)
    *B29D 22/00* (2006.01)
    *B65B 5/02* (2006.01)

(52) U.S. Cl.
    CPC ........... *B65D 75/327* (2013.01); *B65D 77/30* (2013.01); *B65D 77/38* (2013.01); *B65D 2575/362* (2013.01)

(58) Field of Classification Search
    USPC .......................................... 53/467, 471, 478
    See application file for complete search history.

(56) References Cited

U.S. PATENT DOCUMENTS

| | | | |
|---|---|---|---|
| 3,074,544 A | 1/1963 | Bollmeier et al. | |
| 3,120,336 A | 2/1964 | Whatley, Jr. | |
| 3,189,227 A | 6/1965 | Hobbs et al. | |
| 3,256,981 A | 6/1966 | Kurtz | |
| 3,294,227 A | 12/1966 | Schneider et al. | |
| 3,301,390 A | 1/1967 | Via, Jr. | |
| 3,342,326 A | 9/1967 | Zackheim | |
| 3,419,137 A | 12/1968 | Walck, III | |
| 3,573,069 A | 3/1971 | Keller et al. | |
| 3,608,709 A | 9/1971 | Pike | |
| 3,630,346 A * | 12/1971 | Burnside ................ | B65D 75/32 206/532 |
| 3,635,376 A | 1/1972 | Hellstrom | |
| 3,726,395 A * | 4/1973 | Duhy .................... | B65D 77/22 206/449 |
| 3,749,236 A | 7/1973 | Dahl | |
| 3,872,970 A * | 3/1975 | Edison ................ | B65D 75/326 206/532 |
| 3,910,410 A * | 10/1975 | Shaw .................... | B65D 75/26 220/359.3 |
| 3,921,805 A | 11/1975 | Compere | |
| 3,939,287 A * | 2/1976 | Orwig .................... | A23L 3/3409 426/316 |
| 3,964,604 A | 6/1976 | Prenntzell | |
| 4,069,645 A | 1/1978 | Vetter | |
| 4,164,111 A * | 8/1979 | Di Bernardo ........ | B65B 31/024 53/434 |
| 4,243,144 A * | 1/1981 | Margulies .......... | B65D 75/5855 206/532 |
| 4,275,840 A | 6/1981 | Staar | |
| 4,301,923 A | 11/1981 | Vuorento | |
| 4,402,402 A | 9/1983 | Pike | |
| 4,485,920 A | 12/1984 | Skylvik | |
| 4,511,052 A | 4/1985 | Klein et al. | |
| D279,808 S | 7/1985 | Pharo | |
| 4,540,089 A | 9/1985 | Maloney | |
| 4,597,244 A | 7/1986 | Pharo | |
| 4,610,684 A | 9/1986 | Knox et al. | |
| 4,632,244 A | 12/1986 | Landau | |
| 4,673,086 A * | 6/1987 | Braverman ......... | B65D 75/327 206/538 |
| 4,691,820 A * | 9/1987 | Martinez ............. | B65D 75/326 206/205 |
| 4,704,314 A | 11/1987 | Hsu et al. | |
| 4,711,359 A | 12/1987 | White et al. | |
| 4,759,472 A | 7/1988 | Strenger | |
| 4,793,123 A | 12/1988 | Pharo | |
| 4,798,288 A | 1/1989 | Holzner | |
| 4,872,556 A | 10/1989 | Farmer | |
| 4,872,558 A | 10/1989 | Pharo | |
| 4,874,093 A | 10/1989 | Pharo | |
| 4,890,744 A | 1/1990 | Lane, Jr. et al. | |
| 4,918,904 A | 4/1990 | Pharo | |
| 4,949,530 A | 8/1990 | Pharo | |
| 4,961,495 A | 10/1990 | Yoshida et al. | |
| 5,050,736 A | 9/1991 | Griesbach | |
| 5,100,028 A | 3/1992 | Seifert | |
| 5,114,004 A | 5/1992 | Isono et al. | |
| 5,126,070 A | 6/1992 | Leifheit et al. | |
| 5,131,760 A | 7/1992 | Farmer | |
| 5,137,154 A | 8/1992 | Cohen | |
| 5,167,974 A * | 12/1992 | Grindrod ................ | B65B 11/50 156/152 |
| 5,207,320 A | 5/1993 | Allen | |
| 5,215,221 A | 6/1993 | Dirksing | |
| 5,272,856 A | 12/1993 | Pharo | |
| 5,307,985 A * | 5/1994 | Beizermann ......... | B65D 77/225 206/439 |
| 5,325,968 A | 7/1994 | Sowden | |
| 5,373,966 A | 12/1994 | O'Reilly et al. | |
| 5,375,698 A * | 12/1994 | Ewart .................. | A45C 11/005 206/205 |
| 5,395,632 A * | 3/1995 | Lawless ................ | B65D 75/32 426/129 |
| D357,352 S | 4/1995 | Abrams et al. | |
| 5,405,629 A * | 4/1995 | Marnocha .......... | B65D 33/2533 206/466 |
| D358,028 S | 5/1995 | Abrams et al. | |
| 5,427,830 A | 6/1995 | Pharo | |
| 5,445,274 A | 8/1995 | Pharo | |
| 5,447,235 A | 9/1995 | Pharo | |
| 5,481,852 A * | 1/1996 | Mitchell ................ | B65B 31/04 426/129 |
| 5,487,470 A | 1/1996 | Pharo | |
| 5,492,219 A | 2/1996 | Stupar | |
| D371,678 S | 7/1996 | Borghorst et al. | |
| 5,564,591 A | 10/1996 | Christine | |
| D375,258 S | 11/1996 | Weder et al. | |
| 5,588,532 A | 12/1996 | Pharo | |
| D386,074 S | 11/1997 | Pharo | |
| 5,685,130 A | 11/1997 | Horsman | |
| 5,690,222 A * | 11/1997 | Peters .................... | B65D 75/32 206/339 |
| 5,704,468 A * | 1/1998 | Lust ........................ | B65D 1/34 206/205 |
| 5,711,691 A | 1/1998 | Damask et al. | |
| 5,727,679 A * | 3/1998 | Newarski ........... | B65D 81/3205 206/222 |
| 5,775,491 A | 7/1998 | Taniyama | |
| 5,792,213 A | 8/1998 | Bowen | |
| 5,814,159 A | 9/1998 | Paley et al. | |
| 5,824,392 A | 10/1998 | Gotoh | |
| 5,865,309 A | 2/1999 | Futagawa et al. | |
| 5,870,884 A | 2/1999 | Pike | |
| 5,882,789 A * | 3/1999 | Jones ....................... | B32B 7/06 428/34.8 |
| D407,640 S | 4/1999 | Nelson et al. | |
| 5,910,138 A | 6/1999 | Sperko et al. | |
| 5,928,213 A | 7/1999 | Barney et al. | |
| 5,941,052 A * | 8/1999 | Evangelisti ........... | B65B 51/303 53/433 |
| 5,944,709 A | 8/1999 | Barney et al. | |
| 5,967,308 A | 10/1999 | Bowen | |
| 5,975,304 A * | 11/1999 | Cain ..................... | B65D 75/326 206/467 |
| 6,001,187 A | 12/1999 | Paley et al. | |
| 6,007,264 A | 12/1999 | Koptis | |
| 6,036,004 A | 3/2000 | Bowen | |
| 6,068,820 A | 5/2000 | De Guzman | |
| 6,080,456 A * | 6/2000 | Fonteyne .................. | A61L 2/26 428/35.7 |
| D431,863 S | 10/2000 | Richardson | |
| 6,165,161 A | 12/2000 | York et al. | |
| 6,198,106 B1 | 3/2001 | Barney et al. | |

(56) References Cited

U.S. PATENT DOCUMENTS

| | | | |
|---|---|---|---|
| 6,199,698 B1* | 3/2001 | Hetrick | B65D 75/26 206/484 |
| 6,203,535 B1 | 3/2001 | Barney et al. | |
| D445,673 S | 7/2001 | Richardson | |
| 6,412,653 B1* | 7/2002 | Waterhouse | B01F 13/002 206/542 |
| D462,900 S | 9/2002 | Yamada et al. | |
| 6,468,377 B1 | 10/2002 | Sperko et al. | |
| 6,491,159 B2 | 12/2002 | Yukihiko | |
| 6,547,468 B2 | 4/2003 | Gruenbacher et al. | |
| 6,658,400 B2 | 12/2003 | Perell et al. | |
| 6,692,150 B2 | 2/2004 | Hoshino | |
| 6,726,364 B2 | 4/2004 | Perell | |
| 6,846,305 B2 | 1/2005 | Smith et al. | |
| 6,935,492 B1 | 8/2005 | Loeb | |
| 6,938,394 B2 | 9/2005 | Perell | |
| 6,968,952 B2 | 11/2005 | Crevier et al. | |
| 6,996,951 B2 | 2/2006 | Smith et al. | |
| 7,004,354 B2 | 2/2006 | Harper | |
| D520,357 S | 5/2006 | Terrasi | |
| 7,051,879 B2 | 5/2006 | Ramet | |
| 7,055,683 B2 | 6/2006 | Bourque et al. | |
| 7,086,526 B2* | 8/2006 | Newman | A45C 11/005 206/5.1 |
| 7,175,614 B2 | 2/2007 | Gollier et al. | |
| 7,306,095 B1 | 12/2007 | Bourque et al. | |
| 7,306,371 B2 | 12/2007 | Perell | |
| D559,550 S | 1/2008 | Saitoh | |
| D562,135 S | 2/2008 | Studee | |
| 7,426,993 B2* | 9/2008 | Coldrey | B65D 75/366 206/5.1 |
| 7,597,691 B2 | 10/2009 | Kawaguchi et al. | |
| 7,644,821 B2 | 1/2010 | Perell | |
| 7,757,893 B2* | 7/2010 | Perell | B65D 75/48 222/107 |
| D620,787 S | 8/2010 | Moriya | |
| 8,051,983 B2* | 11/2011 | Simon | B65D 50/06 206/532 |
| 8,328,017 B2* | 12/2012 | Perell | B65D 75/28 206/484 |
| 8,590,282 B2* | 11/2013 | Perell | B65D 75/58 53/492 |
| 9,365,339 B2 | 6/2016 | Perell et al. | |
| 9,802,745 B2 | 10/2017 | Perell | |
| 2002/0150658 A1 | 10/2002 | Morrissette et al. | |
| 2002/0170832 A1 | 11/2002 | Klair | |
| 2003/0019781 A1 | 1/2003 | Kocher | |
| 2003/0039412 A1* | 2/2003 | Rodick | B65D 33/20 383/211 |
| 2003/0230582 A1 | 12/2003 | Whitmore et al. | |
| 2004/0033338 A1* | 2/2004 | Pratte | B65D 77/046 428/120 |
| 2004/0226848 A1 | 11/2004 | Dunn/Rankin | |
| 2004/0231292 A1* | 11/2004 | Perell | B65D 75/5855 53/403 |
| 2005/0031233 A1* | 2/2005 | Varanese | B65D 33/20 383/211 |
| 2005/0138893 A1* | 6/2005 | Ausnit | B65B 61/188 53/412 |
| 2006/0023976 A1 | 2/2006 | Alvater et al. | |
| 2006/0126970 A1* | 6/2006 | Perell | B65D 75/5855 383/61.1 |
| 2007/0235357 A1 | 10/2007 | Perell | |
| 2007/0235369 A1* | 10/2007 | Perell | B65D 75/5855 206/538 |
| 2007/0237431 A1 | 10/2007 | Perell | |
| 2007/0241024 A1 | 10/2007 | Perell | |
| 2007/0284375 A1 | 12/2007 | Perell | |
| 2007/0286535 A1 | 12/2007 | Perell | |
| 2007/0295766 A1 | 12/2007 | Perell | |
| 2008/0212904 A1* | 9/2008 | Perell | B65D 75/5855 383/210 |
| 2008/0308449 A1* | 12/2008 | Intini | B65D 75/367 206/532 |
| 2009/0008285 A1* | 1/2009 | Miller | B32B 5/022 206/531 |
| 2009/0114677 A1 | 5/2009 | Stuart | |
| 2010/0181318 A1* | 7/2010 | Bava | B65D 43/022 220/378 |
| 2010/0278462 A1 | 11/2010 | Sorensen | |
| 2010/0326989 A1* | 12/2010 | Perell | B65D 75/5861 220/265 |
| 2011/0200275 A1* | 8/2011 | Perell | B31B 50/81 383/210.1 |

FOREIGN PATENT DOCUMENTS

| | | |
|---|---|---|
| EP | 0709302 A1 | 6/1996 |
| FR | 2345363 A1 | 10/1977 |
| FR | 2910884 | 1/2007 |
| GB | 2253605 A | 9/1992 |
| JP | 04215927 A | 8/1992 |
| JP | 7/8236 | 7/1995 |
| JP | 11029176 A | 2/1999 |
| JP | 2000255598 A | 9/2000 |
| JP | 2002503187 | 1/2002 |
| JP | 2002037327 | 2/2002 |
| JP | 2003146364 | 5/2003 |
| WO | WO 94/07761 | 4/1994 |
| WO | WO 1996/023700 A1 | 8/1996 |
| WO | WO 2002/083504 A1 | 10/2002 |
| WO | WO 2004/100856 A2 | 11/2004 |
| WO | WO 2005/022323 A | 3/2005 |
| WO | WO 2005/077811 A1 | 8/2005 |
| WO | WO2009/086344 A1 | 7/2009 |
| WO | WO2009/086346 A1 | 7/2009 |
| WO | WO2009/088759 A1 | 7/2009 |

* cited by examiner

RIGID HOLDING CONTAINER WITH BREACHABLE PERIMETER BUBBLE

RELATED APPLICATIONS

The present application is based on and claims priority to U.S. patent application Ser. No. 13/966,465, filed on Aug. 14, 2013, which claims priority to U.S. patent application Ser. No. 12/810,316, filed on Aug. 11, 2010, which claims priority to PCT international Application No. PCT/US2008/088100, which has an international filing date of Dec. 23, 2008, and which claims priority to U. S. Provisional Patent Application Ser. Nos. 61/009,491, filed on Dec. 31, 2007 and 61/046,655, filed on Apr. 21, 2008, which are all incorporated herein by reference in theft entirety.

BACKGROUND

Thermo-formed plastic containers are used to hold many different items and products. Such containers, for instance, are used to hold food items including meal ready-to-eat ("MRE") rations, medical products, and various general merchandise. In some applications, the containers may be vacuum packaged in a sealed container containing a reduced pressure environment.

In one embodiment, the thermo-formed container may comprise a rigid, molded base that is sealed around the perimeter to a clear plastic film. Such containers, for instance, are used to package sliced lunch meats. Such containers, however, can be difficult to open. The containers, for instance, typically include a frayed corner where the rigid base has been partially separated from the plastic film top. In order to open the container, a user can grasp the plastic film in the corner and peel the film away from the rigid base.

Unfortunately, difficulties can arise in attempting to separate the two parts of the container. These problems can become more enhanced in operating rooms where technicians are attempting to open the package wearing gloves. In addition, the frayed corner can provide a space for collecting or harboring contaminants, such as microorganisms, in between the plastic film and the rigid base prior to opening.

In view of the above, a need currently exists for a thermo-formed container as described above that includes an improved mechanism for opening the container.

SUMMARY

In general, the present disclosure is directed to a rigid holding container that includes a breachable bubble for facilitating opening of the container. For example, in one embodiment, the container includes a rigid support that defines an item compartment.

As used herein, the term "rigid" includes not only rigid containers but semi-rigid containers. Specifically, a rigid container as used herein refers to any container made from a material that retains its shape. A flexible closure, which may comprise a single or multi-layer film, is attached to the rigid support for closing the item compartment and forming part of the container. More particularly, a peripheral seal is located between the rigid support and the flexible closure. The peripheral seal circumscribes an access opening into the item compartment.

In accordance with the present disclosure, a breachable bubble is present between the rigid or semi-rigid support and the flexible closure and is located outside of the peripheral seal. A breachable seal is formed along an edge of the breachable bubble. The breachable bubble is spreadable under applied pressure into the breachable seal. The spreading separates the flexible closure from the rigid support until the spreading bubble produces an edge breach through the breachable seal to the exterior environment. In this manner, the rigid support becomes separated from the flexible closure allowing a user to peel the flexible closure away from the rigid support to produce the access opening.

The following is a list of different embodiments and features that may be incorporated into the container.

Food Tray Embodiment

The holding container may be a cardboard, aluminum or thermo-formed serving tray for packaged foods. The cover sheet may be thin tear-away film, which is transparent to permit viewing the food. The cover-lid seal preserves the food.

Stacking

Packaged foods are stacked during shipment, in the stores, and in the consumer's freezer. The bubble in the under-packages is not affected by the tray of the over-package because of a perimeter lip. Vertical stacking registration prevents the weight of the upper trays from pressing down on the bubbles of the lower trays.

Under Bubble Embodiment

The trays of packaged foods may be presented in individual outer cardboard cartons. Placing the bubble on the underside of the lip isolates the bubble from the carton. The under bubble embodiment may include a wraparound cover over the perimeter of the tray. The wrap-around cover protects the lip surfaces during normal handling and packaging. When the wraparound cover is peeled away, these lip surfaces are free of pathogens and other contaminants.

Multiple Bubble Embodiments

The serving tray may have multiple bubbles in multiple locations around the lip. There may be a primary bubble for first use, and a secondary bubble for back-up in case the primary bubble fails. The serving tray may contain more than one item which are accessed by separate bubbles. Each item is not exposed to adjacent items until the consumer removes one or more of the separate covers.

U.S. Pat. No. 6,726,364 issued on Apr. 27, 2004 to the present inventor shows a breaching bubble which forms opposed peel flaps along perimeter breach. The flaps are peeled back by the user to open a chamber and present a product. The subject matter of U.S. Pat. No. 6,726,364 is hereby incorporated by reference in its entirety into this disclosure. Breachable bubbles are also disclosed in U.S. Pat. Nos. 6,938,394; 7,306,371; U.S. Patent Application Publication No. 2004/0231292; U.S. Patent Application Publication No. 2006/0126970; U.S. Patent Application Publication No. 2007/0295766; U.S. Patent Application Publication No. 2007/0286535; U.S. Patent Application Publication No. 2007/0235369; U.S. Patent Application Publication No. 2007/0237431; U.S. Patent Application Publication No. 2007/0241024; U.S. Patent Application Publication No. 2007/0235357; and U.S. Patent Application Publication No. 2007/0284375, which are all incorporated herein by reference.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
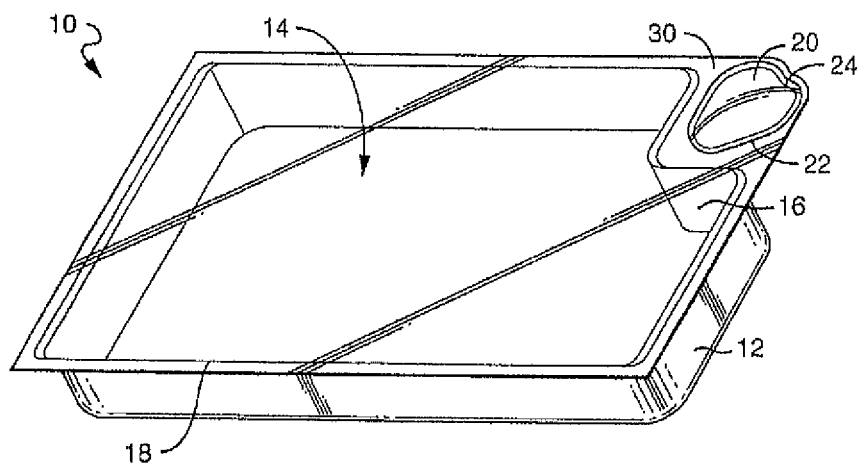
FIG. 1 is a perspective view of one embodiment of a container made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a sealed container having an improved opening mechanism. In one embodiment, the container includes a rigid base that is sealed along at least one side to a film. The film can be transparent or translucent so that one can view the contents of the container. In an alternative embodiment, the film can be opaque, especially when the contents are light sensitive. In still another embodiment, the film can be printed with a design or text and can be made to include transparent or translucent sections in addition to opaque sections. In accordance with the present disclosure, the container further includes a breachable bubble located in between the film and the rigid base. By breaching the bubble, a portion of the film and the rigid base separate allowing a user to peel the film away from the rigid base to open the container.

Figure 2:
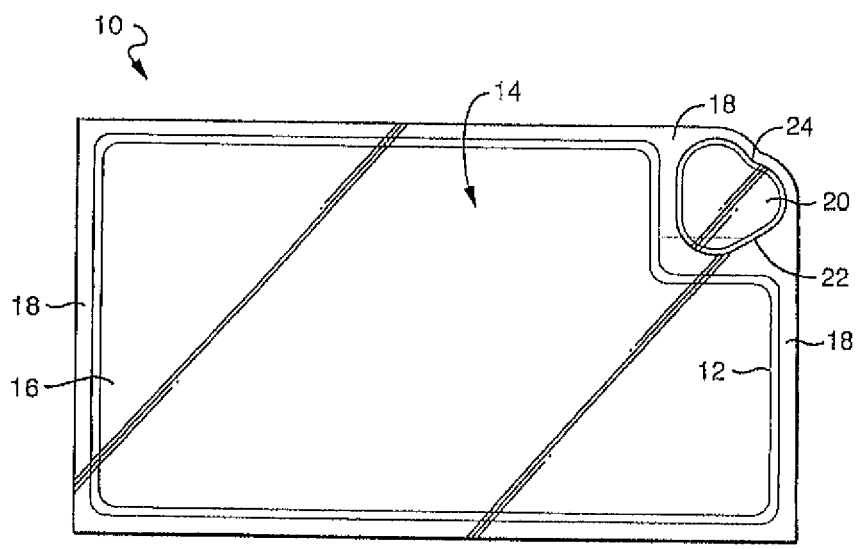
FIG. 2 is a plan view of the container illustrated in FIG. 1.
Figure 3:
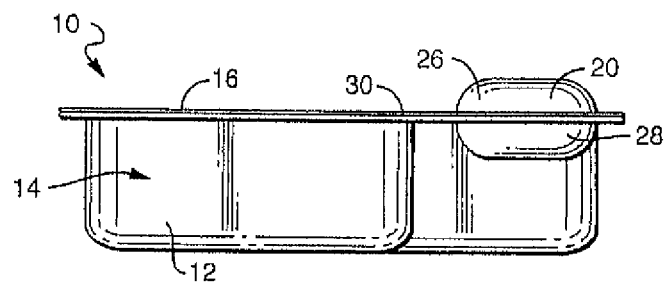
FIG. 3 is a side view of the container illustrated in FIG. 1.

Referring to FIGS. 1-3, for instance, one exemplary embodiment of a container 10 made in accordance with the present disclosure is illustrated. As shown, the container 10 includes a rigid support 12 that defines an item compartment 14. The item compartment 14 can have any suitable size and shape and can be designed to hold various different items. For example, the item compartment 14 may be configured to hold food items, medical instruments, general merchandise, and the like.

The rigid support 12 can be made from any suitable material capable of retaining the desired shape. The rigid support 12, for instance, may be made from a paperboard including cardboard, a metal such as aluminum, or from any suitable plastic or polymeric material. In one embodiment, for instance, the rigid support can be made from a plastic material that is thermo-formed. Suitable plastics that may be used to form the rigid support 12 include, for instance, polyvinyl chloride, polystyrene, polyester, a polyamide such as nylon, mixtures thereof, and the like. The rigid support 12, for instance, may be made from any suitable homopolymer or copolymer.

Attached to the rigid support 12 is a flexible closure 16. The flexible closure 16, in the embodiment illustrated, covers an access opening to the item compartment 14. More particularly, the flexible closure 16 is attached to the rigid support 12 by a peripheral seal 18. The peripheral seal 18, for instance, can create a fluid-tight attachment between the flexible closure 16 and the rigid support 12.

The flexible closure 16 can generally comprise any suitable planar material. For example, the flexible closure 16 can be made from paper, a fabric such as a woven or nonwoven fabric, or a film material. When made from a film material, the flexible closure can be made from any suitable polymer. Polymers that may be used to form the flexible closure 16 include, for instance, polyolefins such as polyethylene and polypropylene, polyesters, polyamides, polyvinyl chloride, mixtures thereof, copolymers and terpolymers thereof, and the like. In addition, the flexible closure 16 can also be made from any suitable elastomeric polymer.

When the flexible closure 16 is made from a polymer, the flexible closure can include a single layer of material or can include multiple layers. For instance, in one embodiment, the flexible closure can include a core layer of polymeric material coated on one or both sides with other functional polymeric layers. The other functional polymeric layers may include, for instance, a heat sealing layer for thermally bonding the flexible closure to the rigid support 12, an oxygen barrier layer, an ultraviolet filter layer, an anti-blocking layer, a printed layer, and the like.

The flexible closure 16, especially when made from polymer materials, can be translucent or transparent. If translucent or transparent, for instance, the contents of the item compartment 14 can be viewed from the outside of the container. In other embodiments, however, the flexible closure can be opaque. For instance, in one embodiment, light sensitive materials may be contained in the container.

The manner in which the flexible closure 18 is attached to the rigid support 12 can also vary depending upon the particular application and the different materials used to construct the container. For instance, the flexible closure can be attached to the rigid support through thermal bonds, ultrasonic bonds, adhesive bonds, or the like.

In accordance with the present disclosure, the container 10 as shown in FIGS. 1-3 further includes a breachable bubble 20. In the embodiment illustrated, the breachable bubble 20 is formed in between the rigid support 12 and the flexible closure 16. In other embodiments, however, the breachable bubble 20 may be formed in between only one of the above container components as long as the bubble is capable of producing a peelable edge between the rigid support and the flexible closure as will be described in greater detail below.

In the embodiment illustrated in FIGS. 1-3, the breachable bubble 20 is also located outside of the peripheral seal 18. The breachable bubble 20 is surrounded by and defined by a seal 22 that is at least partially breachable. For example, the bubble seal 22 can include a breachable portion 24 that faces the outermost edge of the container 10. The breachable portion 24 represents a portion of the bubble seal 22 that more easily separates than the remainder of the seal. The breachable portion 24 can be made using any suitable method or technique. For instance, less adhesive may be used in this portion if the bubble seal 22 is made using an adhesive. If the bubble seal 22 is made by applying heat and pressure to form a thermal bond, the breachable portion 24 may be made by varying the pressure of the seal bar, varying the temperature, or varying the amount of time the seal bar is in contact with the materials along the breachable portion.

In other embodiments, the breachable portion 24 or the entire bubble seal 22 may comprise a peel seal. Various different methods and techniques are used to form peel seal portions. For example, in one embodiment, the breachable portion 24 of the bubble seal 22 or the entire bubble seal may include a first portion that is adhesively secured to a second portion along the seal. The first portion may be coated with a pressure sensitive adhesive. The adhesive may comprise, for instance, any suitable adhesive, such as an acrylate.

The second and opposing portion of the peel seal, on the other hand, may comprise a film coated or laminated to a release layer. The release layer may comprise, for instance, a silicone.

When using an adhesive layer opposite a release layer as described above, the bubble seal is resealable after the bubble is breached.

In an alternative embodiment, each opposing portion of the peel seal may comprise a multi-layered film. The major layers of the film may comprise a supporting layer, a pressure sensitive adhesive component, and a thin contact layer. In this embodiment, the two portions of the peel seal can be brought together and attached. For instance, the thin contact layer of one portion can be attached to the thin contact layer of the opposing portion using heat and/or pressure. When the locking bubble 18 is breached, and the peel seal is peeled apart, a part of the sealed area of one of the contact layers tears away from its pressure sensitive adhesive component and remains adhered to the opposing contact layer. Thereafter, resealing can be affected by re-engaging this torn away contact portion with the pressure sensitive adhesive from which it was separated when the layers were peeled apart.

In this embodiment, the contact layer can comprise a film having a relatively low tensile strength and having a relatively low elongation at break. Examples of such materials include polyolefins such as polyethylenes, copolymers of ethylene and ethylenically unsaturated comonomers, copolymers of an olefin and an ethylenically unsaturated monocarboxylic acid, and the like. The pressure sensitive adhesive contained within the layers, on the other hand, may be of the hot-melt variety or otherwise responsive to heat and/or pressure.

In still another embodiment, the breachable portion 24 of the bubble seal 22 or the entire bubble seal can include a combination of heat sealing and adhesive sealing. For instance, in one embodiment, the bubble seal may comprise a first portion that is heat sealed to a second portion. Along the breachable portion, however, may also exist a peel seal composition that may, in one embodiment, interfere with the heat sealing process of the bubble seal to produce a breachable portion. The peel seal composition, for instance, may comprise a lacquer that forms a weak portion along the bubble seal.

In an alternative embodiment, an adhesive may be spot coated over the length of the breachable point. Once the breachable portion is breached, the adhesive can then be used to reseal the two portions together after use.

The breachable bubble 20 is expandable to open the container 10 by external pressure applied by a consumer. For small bubbles, the consumer may simply pinch a bubble or bubbles between his thumb and forefinger. Slightly larger bubbles may require thumb-to-thumb pressure. Pressure can also be applied to the bubble by placing the bubble against a flat surface and applying pressure with one's fingers or palm. For example, when the container 10 is to be opened in an operating room, a nurse or physician may want to apply pressure to the bubble by laying the bubble adjacent to a surface and applying pressure in order to facilitate opening of the container, especially when the attendants in the operating room are wearing medical or surgical gloves.

When pressure is applied to the breachable bubble 20, the atmosphere within the bubble applies pressure to the bubble seal 24 which causes the two layers of material used to form the bubble to separate. Separation occurs along the breachable portion 24 creating an edge breach.

Once the edge of the container is breached, a pair of opposing flaps are formed. At least one of the flaps forms a peelable tab that can be grasped by the user for manually peeling the flexible closure 16 away from the rigid support 12.

Of particular advantage, the peelable tab is formed by breaching the bubble as opposed to being formed during the manufacturing process of the container 10 itself. In this manner, the outside perimeter of the container 10 can be completely sealed against the environment to prevent any contamination of the container or the product contained inside. Also of advantage is that the breachable bubble does not provide any small spaces or locations where contaminants such as microorganisms may harbor. In addition, opening the container by breaching the bubble may be much easier than opening many of the conventional containers made in the past that are intended to include peel away corners.

As described above, once the bubble 20 is breached, a peelable tab is formed that allows the user to peel the flexible closure 16 away from the rigid support 12. In this regard, the peripheral seal 18 can be designed to be completely frangible so that the flexible closure 16 can be completely separated from the rigid support 12. Alternatively, the peripheral seal 18 can be designed so as to only be partially frangible. In this embodiment, once the flexible closure is peeled away from the rigid support, the flexible closure 16 will remain connected to the rigid support 12.

In general, the breachable bubble 20 can have any suitable shape. For example, in one embodiment, as shown in FIGS. 1-3, the breachable bubble 20 can have a triangular-like shape. In particular, the breachable bubble 20 illustrated in the figures has a heart-like shape positioned within the corner of the container 10. In other embodiments, however, the breachable bubble can have a circular shape, an oval shape, a rectangular shape, or any other suitable shape.

As shown in FIGS. 1 and 2, the breachable bubble 20 is positioned on an overhang 30 that is generally in the same plane as the top of the rigid support 12. In accordance with the present disclosure, the breachable bubble 20 can be designed so as to project upwards and downwards, only project upwards, or only project downwards. For example, in FIG. 3, the breachable bubble includes a top portion 26 and a bottom portion 28. The top portion 26 extends above the overhang 30 while the bottom portion 28 extends below the overhang 30.

Figure 4:
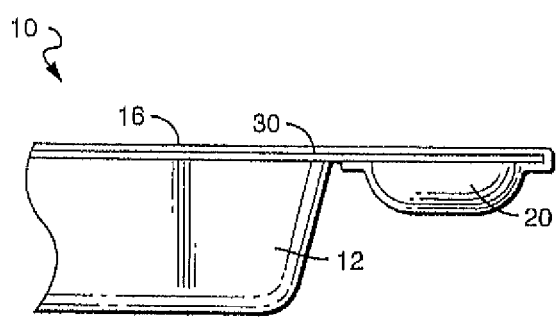
FIG. 4 is a side view with cutaway portions of an alternative embodiment of a container made in accordance with the present disclosure.

Referring to FIG. 4, an alternative configuration of a container generally 10 made in accordance with the present disclosure is illustrated. Like reference numerals have been used to indicate similar elements. In the embodiment illustrated in FIG. 4, the container 10 includes a flexible closure 16 attached to a rigid support 12. The rigid support 12 further includes an overhang 30 where a breachable bubble 20 is positioned. In this embodiment, the breachable bubble 20 only extends in a downward direction. Thus, the bubble 20 includes only a bottom portion. The embodiment illustrated in FIG. 4 is well suited to applications where it may be desirable to breach the bubble by placing the bubble against an adjacent surface and applying pressure.

Figure 5:
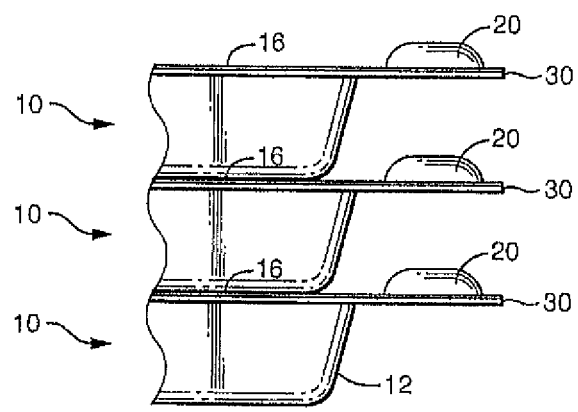
FIG. 5 is a side view with cutaway portions illustrating multiple containers being stacked together in accordance with the present disclosure.

Referring to FIG. 5, still another embodiment of a plurality of containers generally 10 made in accordance with the present disclosure are illustrated. Each container 10 includes a rigid support 12 attached to a flexible closure 16. Each container 10 further includes an overhang 30 where a breachable bubble 20 is located. In this embodiment, each breachable bubble 20 only extends in an upward direction. Thus, each bubble 20 only includes a top portion.

As shown in FIG. 5, the containers can also be designed so as to stack conveniently together during shipment, in retail stores, and at the location of use. When designing a container that is intended to stack together, the breachable bubble 20 can be designed so as to not interfere with the stacking arrangement. For example, in one embodiment, the container can include an overhang where the breachable bubble is located so that the bubble does not contact an opposing container.

Figure 6:
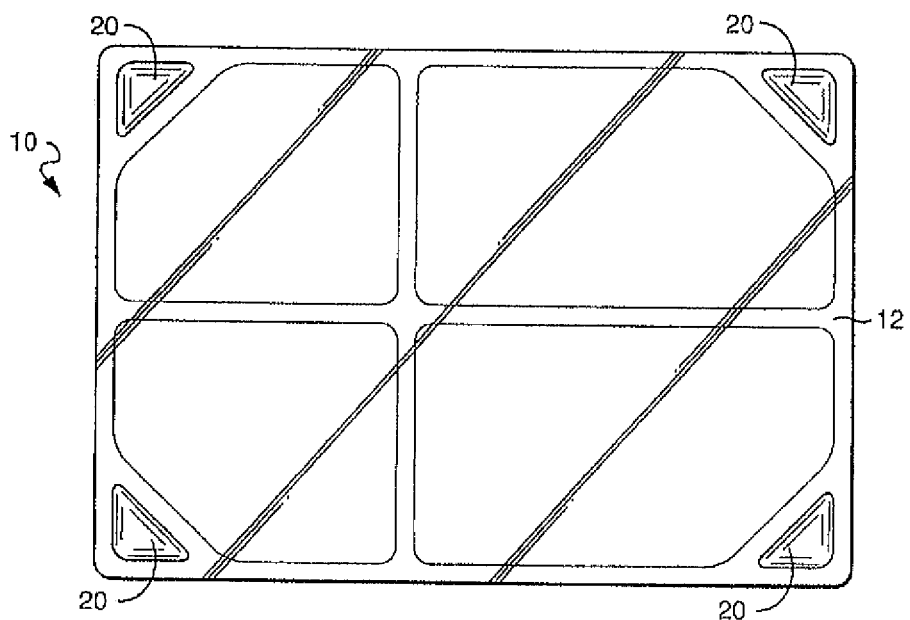
FIG. 6 is a plan view of another embodiment of a container made in accordance with the present disclosure.

Referring to FIG. 6, still another embodiment of a container 10 made in accordance with the present disclosure is shown. In this embodiment, the container 10 includes a rigid support 12 that has been molded to have multiple compartments. Each compartment can be sealed by a different flexible closure or, alternatively, a single flexible closure can cover all of the compartments. As shown in FIG. 6, in this embodiment, the container 10 can include multiple breachable bubbles 20. For example, in the embodiment illustrated in FIG. 6, the container 10 includes four breachable bubbles positioned at each of the corners. In particular, a breachable bubble is present for each subcompartment formed by the rigid support 12. Each breachable bubble 20 can be used to open and access one of the subcompartments.

Figure 7:
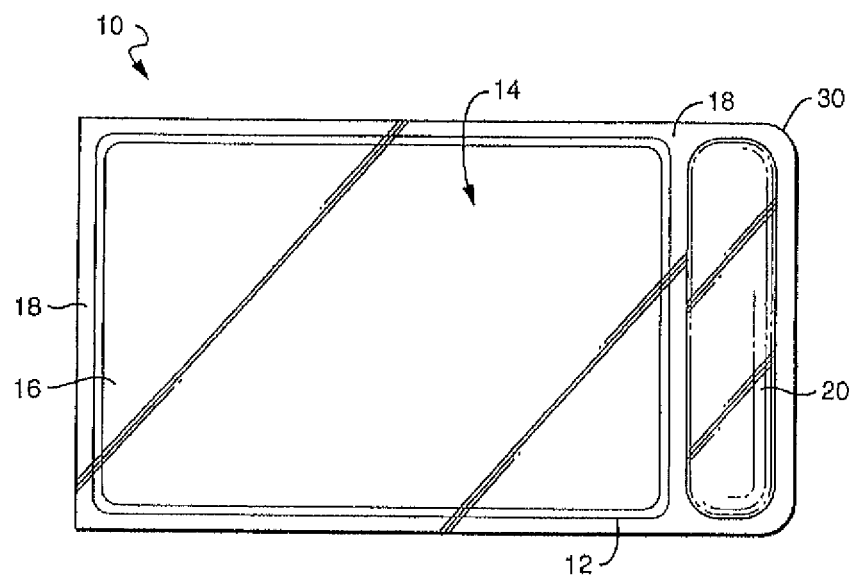
FIG. 7 is a plan view of still another embodiment of a container made in accordance with the present disclosure.

Referring to FIG. 7, still another embodiment of a container 10 made in accordance with the present disclosure is shown. The reference numerals used in the previous figures have also been used in this figure to show similar elements. As illustrated, the container 10 includes a rigid support 12 attached to a flexible closure 16 by a peripheral seal 18. The rigid support 12 defines an item compartment 14. The container 10 further includes an overhang 30 where a breachable bubble 20 made in accordance with the present disclosure is positioned. In this embodiment, the breachable bubble has an elongated shape and extends a substantial portion along a length of the end of the container. For example, the breachable bubble 20 can extend greater than one-half the distance of the side of the container 10, such as greater than about 60% of the distance of the side of the container, such as greater than about 80% of the side of the container. By creating an elongated breachable bubble 20 as shown in FIG. 7, the bubble may be easier to breach for the user, especially when pressure is applied to the bubble as it rests against an adjacent surface.

The embodiment illustrated in FIG. 7, for instance, may be particularly well suited for containing sterile medical supplies including bandages, surgical instruments, implants, and the like. Such items must typically be delivered to an operating room contained in a package in a sterile condition. The package then must be opened by a medical personnel while wearing medical or surgical gloves. The presence of the gloves can interfere with the ability to open a sealed package. By having an elongated bubble as shown in FIG. 7, however, one can breach the bubble by placing the bubble against an adjacent surface and applying pressure. In one embodiment, for instance, the bubble 20 may extend downwardly as shown in FIG. 4. Once breached, the elongated bubble may produce a relatively large peelable tab that can be grasped by a user even when wearing gloves.

It should be understood, however, that the embodiment illustrated in FIG. 7 may equally be applicable to hold various other items, such as food items or other general merchandise. For instance, such packages may also be easily opened by the elderly and those that suffer from hand ailments such as arthritis.

As described above, in one embodiment, the container made in accordance with the present disclosure can be liquid tight and/or gas tight. In one embodiment, the item compartment 14 can be made with a controlled atmosphere. For instance, the contents of the container can be vacuum sealed. In this embodiment, for instance, the pressure within the item compartment 14 can be less than atmospheric pressure. In other embodiments, however, the item compartment 14 can be constructed so as to have a pressure greater than atmospheric pressure.

The gas contained within the item compartment 14 can also vary depending upon the particular application. For instance, in one embodiment, the item compartment can simply contain air either below atmospheric pressure, at atmospheric pressure, or above atmospheric pressure.

In an alternative embodiment, however, the item compartment, prior to opening, may contain reduced oxygen levels. For instance, oxygen may be contained in the item compartment in an amount less than about 5% by volume. In one embodiment, for instance, the item compartment can be filled with an inert gas during construction of the container. Suitable inert gases that may be used include, for instance, nitrogen gas or any of the other noble gases. Constructing the container so that the item compartment is vacuum sealed and/or contains an oxygen-starved environment may be well suited to packaging food items that may otherwise spoil faster.

In still another embodiment, the item compartment can contain an antimicrobial agent that may create a substantially sterile environment. For instance, antimicrobial agents that may be contained in the item compartment include various gaseous chemosterilizers such as ethylene oxide, propylene oxide, beta-propiolactone, ozone, carbon dioxide, a halogen gas, or the like.

The fluid contained within the breachable bubble can also vary depending upon the particular application. For instance, in one embodiment, the breachable bubble can contain air at any suitable pressure. In other embodiments, however, an inert gas may be placed within the bubble. In still another embodiment, the breachable bubble may contain any of the antimicrobial agents described above to ensure that the entire package remains sterile and does not harbor any contaminants.

It should also be understood that the atmosphere within the item compartment can be the same or different than the atmosphere within the breachable bubble. For instance, in one embodiment, the fluid or gas contained within the item compartment can be different than the fluid or gas contained within the breachable bubble. In one particular embodiment, for instance, the item compartment may contain an inert gas or may otherwise contain an oxygen-starved gas mixture, while the breachable bubble may contain a gaseous hemosterilizer.

In still another embodiment, the antimicrobial agent may comprise a coating that can be present on the inside surface of the item compartment and on the inside surface of the breachable bubble.

The containers made according to the present disclosure can be made using any suitable manufacturing process. For example, when formed from plastic materials, the container can be made using similar packaging machines to those disclosed in U.S. Pat. Nos. 5,685,130 and 4,069,645, which are incorporated herein by reference.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

We claim as our invention:

1. A container, comprising:
   a support comprising an item compartment surrounded by a compartment perimeter and an overhang extending beyond the item compartment, the overhang comprising a bubble compartment surrounded by a bubble perimeter with a concave aspect located within a corner of the overhang and outside of the compartment perimeter;
   a flexible closure attached to the compartment perimeter and to the bubble perimeter, the flexible closure providing a peripheral seal around the compartment perimeter and providing a bubble seal around the bubble perimeter;
   a breachable bubble defined between a lip of the bubble perimeter and the flexible closure; and
   a breachable portion along the bubble seal at the concave aspect of the bubble perimeter;
   wherein the breachable bubble is configured for thumb-and-finger pinching, and wherein when pressure is applied to the breachable bubble from said pinching, an atmosphere within the breachable bubble applies pressure to the bubble seal which causes an edge breach at the breachable portion of the bubble seal, the edge breach providing a peelable edge at the concave aspect for facilitating opening of the item compartment.

2. The container of claim 1, wherein at least a portion of the container is thermo-formed.

3. The container of claim 1, comprising:
   an item in the item compartment.

4. The container of claim 1, wherein the peelable edge comprises:
   a flexible peel tab formed by the flexible closure material along the edge breach as the bubble breaches.

5. The container of claim 4, wherein the flexible peel tab is proximate to a fringe of the flexible closure.

6. The container of claim 4, wherein the flexible closure comprises a triangular shaped corner, and wherein the peel tab is located proximate to the triangular shaped corner and is triangular in shape.

7. The container of claim 1, wherein the breachable bubble is elongated and extends along one end of the item compartment.

8. The container of claim 1, wherein:
   the breachable bubble defines a volume, the volume defined by the breachable bubble displacing the support away from the flexible closure and/or the volume defined by the breachable bubble displacing the flexible closure away from the support.

9. The container of claim 8, wherein:
   the volume defined by the breachable bubble displaces the support away from the flexible closure and the flexible closure away from the support.

10. The container of claim 1, wherein the peripheral seal comprises a frangible portion configured to permit disengagement of the flexible closure from the support along the peripheral seal.

11. The container of claim 1, wherein the peripheral seal comprises:
    a frangible portion configured to permit partial disengagement of the flexible closure; and
    a destruct portion configured to prevent complete detachment of the flexible closure from the support.

12. The container of claim 1, further comprising a plurality of storage compartments.

13. The container of claim 1, wherein the breachable bubble contains a gas, the gas comprising an antimicrobial agent.

14. The container of claim 13, wherein the antimicrobial agent comprises ethylene oxide, propylene oxide, beta-propiolactone, ozone, carbon dioxide, a halogen gas, or mixtures thereof.

15. The container of claim 1, wherein the breachable bubble is positioned at one side of the container, the side of the container having a length, the length of the breachable bubble being greater than half the length of the side of the container.

16. The container of claim 1, wherein the item compartment contains a first gas and the breachable bubble contains a second gas and wherein the first gas within the item compartment is different than the second gas within the breachable bubble.

17. The container of claim 1, wherein the breachable portion of the bubble seal comprises a peel seal, the peel seal comprising:
    (a) a first portion adhesively secured to a second portion along the bubble seal, the first portion comprising an adhesive layer, the second portion comprising a release layer; or
    (b) a first portion secured to a second portion along the bubble seal, the first portion and the second portion both comprising a film, the first portion comprising an adhesive layer and a contact layer, the second portion also comprising a contact layer, wherein the contact layer of the first portion is bonded to the contact layer of the second portion and wherein, when the bubble is breached, the contact layer of the first portion separates from the adhesive layer.

18. A container, comprising:
    a thermoformed support comprising an item compartment surrounded by a compartment perimeter and an overhang extending beyond the item compartment, the overhang comprising a bubble compartment surrounded by a bubble perimeter located within a corner of the overhang and outside of the compartment perimeter;
    a flexible closure attached to the compartment perimeter and to the bubble perimeter, the flexible closure providing a peripheral seal around the compartment perimeter and providing a bubble seal around the bubble perimeter;
    a breachable bubble defined between a thermoformed lip of the bubble perimeter and the flexible closure; and
    a gas-tight seal between the flexible closure and the support;
    wherein the bubble seal comprises a breachable portion, the breachable portion located along a portion of the bubble seal at a concave or convex aspect of the bubble seal at a corner of the bubble perimeter, the corner facing an outermost edge of the package;

wherein when pressure is applied to the breachable bubble, an atmosphere within the breachable bubble applies pressure to the bubble seal which causes an edge breach at the breachable portion of the bubble seal, the edge breach providing a peelable edge at the breachable portion for facilitating opening of the item compartment.

19. The container of claim 18, comprising:
a sterile environment within the item compartment, the sterile environment comprising:
(a) a vacuum;
(b) a gaseous environment containing an inert gas; or
(c) a gaseous environment containing an antimicrobial agent comprising a gaseous chemosterilizer.

20. A container, comprising:
a thermoformed support comprising an item compartment surrounded by a compartment perimeter and an overhang extending beyond the item compartment, the overhang comprising a bubble compartment surrounded by a bubble perimeter located within a corner of the overhang and outside of the compartment perimeter;

a flexible closure attached to the compartment perimeter and to the bubble perimeter, the flexible closure providing a peripheral seal around the compartment perimeter and providing a bubble seal around the bubble perimeter; and a breachable bubble defined between a thermoformed lip of the bubble perimeter and the flexible closure;

wherein the bubble seal comprises a breachable portion, the breachable portion located at a concave or convex aspect of the bubble seal at a corner of the bubble perimeter, the corner facing an outermost edge of the package;

wherein when pressure is applied to the breachable bubble, an atmosphere within the breachable bubble applies pressure to the bubble seal which causes an edge breach at the breachable portion of the bubble seal, the edge breach providing a peelable edge at the breachable portion for facilitating opening of the item compartment.

* * * * *